United States Patent [19]
Takizawa et al.

[11] Patent Number: 5,625,762
[45] Date of Patent: Apr. 29, 1997

[54] METHOD FOR EXTRACTING THREE-DIMENSIONAL COLOR VECTOR

[75] Inventors: Yuri Takizawa, Machida; Shinichiro Miyaoka, Kawasaki; Makoto Kato, Yokohama; Makoto Nohmi, Kawasaki, all of Japan

[73] Assignee: Hitachi, Ltd., Tokyo, Japan

[21] Appl. No.: 698,122

[22] Filed: May 10, 1991

[30] Foreign Application Priority Data

May 11, 1990 [JP] Japan .................................. 2-119827

[51] Int. Cl.⁶ ...................................................... G06T 7/00
[52] U.S. Cl. .......................... 395/131; 382/162; 382/191; 382/202
[58] Field of Search ........................ 395/119, 120, 395/141, 143, 124, 131, 137; 382/17, 24, 48, 162, 191, 202; 358/27–29, 32; 364/413.19; 345/126

[56] References Cited

U.S. PATENT DOCUMENTS

| | | | |
|---|---|---|---|
| 4,611,292 | 9/1986 | Ninomiya et al. | 382/48 X |
| 4,962,540 | 10/1990 | Tsujiuchi et al. | 382/17 |
| 4,998,286 | 3/1991 | Tsujiuchi et al. | 382/17 X |
| 5,010,502 | 4/1991 | Diebel et al. | 395/119 |
| 5,058,040 | 10/1991 | Tajima | 395/131 |
| 5,175,773 | 12/1992 | Garreau et al. | 364/413.19 X |
| 5,179,598 | 1/1993 | DiFoggio et al. | 382/48 |

OTHER PUBLICATIONS

G.J. Klinker: International Journal of Computer Vision No. 1, vol. 2, pp. 7–32 (1988.6).

*Primary Examiner*—Mark K. Zimmerman
*Attorney, Agent, or Firm*—Fay, Sharpe, Beall, Fagan, Minnich & McKee

[57] ABSTRACT

A method for extracting a three-dimensional color vector from a three-dimensional color space in which correlated features are distributed includes steps of projecting the three-dimensional color space on a two-dimensional plane, displaying the two-dimensional plane on a display screen of a display, designating a line segment on the display screen by an input device, and executing the above steps at least two times by changing the angle of projection between the three-dimensional space and the two-dimensional plane to extract the color vector.

9 Claims, 4 Drawing Sheets ism METHOD FOR EXTRACTING THREE-DIMENSIONAL COLOR VECTOR

CROSS-REFERENCE TO RELEVANT APPLICATIONS

The present application is relevant to copending U.S. patent application Ser. No. 493,447 filed Mar. 14, 1990, and the contents of which are incorporated herein by reference.

BACKGROUND OF THE INVENTION

The present invention relates to a method for seeking a three-dimensional vector in a three-dimensional feature space, that is, a method for seeking a three-dimensional vector indicating the distribution of features in a three-dimensional space when the features are linearly distributed. More particularly, the present invention relates to a three-dimensional vector extracting method suitable for extracting, from an object region of a color image plotted in a space of three primary colors, a color vector used for the color changing of the object region, that is, a color vector of at least one of a specular reflection vector of the object, a diffuse reflection vector of the object and an ambient vector.

The reference "The Measurement of Highlights in Color Images" reported by G. K. Klinker et al. in International Journal of Computer Vision, No. 1, Vol. 2, pp. 7–32 (1988.6) discloses a method which is related the method of the present invention.

Statistical methods as well as analytical methods such as principal component analysis and clustering have hitherto been used as methods for seeking the distribution of features in a feature space. Among these methods, it is most customary to use the method of principal component analysis so as to seek the axes of the principal components when there is a correlation between the components of the features.

In the case of the principal component analysis, it is necessary to divide the features into a plurality of groups prior to the analysis when there are a plurality of groups of correlated features in the feature space.

In the reference cited above, the method of principal component analysis is used to seek, from a three-dimensional feature space, vectors indicating linearly clustering correlated features. That is, in the reference, a plurality of vectors are extracted on the basis of the values of pixels of an object region in a color image plotted in a space of three primary colors. It is assumed that the extracted vectors are connected together at about their start and end points and that the directions of the vectors to be linked are not the same directions, and that the values of all of the vector components are positive. The clustering and plotted points exist in the vicinity of these vectors. In the reference, the vectors are extracted in a manner which will be described below by reference to FIG. 6.

First, plotted points are classified. For this purpose, a vector is roughly extracted from a distribution 60 of pixel values in an object region as shown in FIG. 6. A point 61 nearest to the origin of an RGB coordinate system and a point 62 remotest from the origin are extracted, and these two points 61 and 62 are connected by a line segment 63. Then, a point 65 is detected where the distance 64 between that point and the line segment 63 is a maximum. When the value of this distance 64 is larger than a predetermined threshold value, the segment 63 is divided, and the point 65 is selected as a start point and an end point respectively of new segments 66 and 67. Then, the segments 66 and 67 are processed in a manner similar to the processing for the segment 63. The above manner of segment division is repeated until the segment 63 can be finally divided into a plurality of segments, thereby extracting vectors.

The classification of the plotted points is such that the distance between each of the individual points and each of the individual segments is detected, and each of the individual points is decided to belong to the nearest segment group.

After the classification of the plotted points, the principal component analysis is made for each of the groups, and the axis of the principal component in each group is taken as a vector, thereby determining an accurate three-dimensional vector.

The method of principal component analysis used in the reference is excellent in that the number of dimensions need not be limited, and a highly reliable three-dimensional vector reflecting the feature distribution can be obtained when pre-processing for removing, for example, noise is carried out prior to the analysis. However, the method of principal component analysis used in the reference is defective in the points enumerated below.

Firstly, when there are a plurality of groups of correlated features in a feature space, it is necessary to carry out, before execution of the principal component analysis, a step of pre-processing for classifying the plotted points in the feature space. This manner of pre-processing in the reference is applicable only when the assumption referred to in the description of the reference is valid with respect to the distribution of features. Thus, the above manner of pre-processing is not universally applicable but differs depending on the distribution of features of an object. Therefore, it is necessary to choose the manner of pre-processing according to the object of vector extraction.

Secondly, because an aggregate of numerical data is handled, the result of the pre-processing and also the result of vector or line extraction are generally provided in the form of numerical data, and it becomes necessary to verify these results. Therefore, it is necessary to provide a method for verifying the suitability or validity of both the pre-processing and the extracted vectors or extracted lines. At the same time, a step of processing for executing the verification also becomes necessary.

Thirdly, the principal component analysis requires vast steps of computations.

SUMMARY OF THE INVENTION

With a view to solve the problems of the reference cited above, the present invention intends to provide a method for extracting a three-dimensional vector from a distribution of correlated features in a three-dimensional feature space.

It is a first object of the present invention to provide a method for extracting a three-dimensional vector, in which the steps of processing need not be changed depending on the distribution of objective features, and a step of pre-processing for classifying plotted points in the three-dimensional feature space is unnecessary.

A second object of the present invention is to provide a three-dimensional vector extracting method in which verification for the result of vector extraction is basically unnecessary.

A third object of the present invention is to provide a three-dimensional vector extracting method in which a three-dimensional vector can be extracted by a sequence of simple processing steps without requiring vast steps of computations.

In the present invention, the following sequence of processing is executed so as to attain the first, second and third objects described above:

(1) Steps of projecting a three-dimensional space on a two-dimensional plane, displaying the two-dimensional plane on a display, and specifying a line segment on the display by an input device are repeated at least two times while changing the angle of projection between the three-dimensional space and the two-dimensional plane.

(2) When the line segments are to be specified on the display, an area is detected where feature plotted points cluster on the two-dimensional plane. On the basis of the specified two segments on the two-dimensional plane, planes each including one of the two segments in the three-dimensional space are computed, and the line of intersection between these two planes is sought.

(3) The point of, intersection between a straight line, passing the start point of one of the two segments on the two-dimensional plane and perpendicularly intersecting the two-dimensional plane in the three-dimensional space, and the line of intersection between the two planes in the three dimensional space is determined as the start point of the vector, and the point of intersection between a straight line, passing the end point of one of the two segments and perpendicularly intersecting the two-dimensional plane in the three-dimensional space, and the line of intersection between the two planes in the three dimensional space is determined as the end point of the vector.

(4) When projecting the three-dimensional space on the two-dimensional plane, the positional relation between a point in the three-dimensional space and the two-dimensional projection plane is fixed, and, as the projection angle, an angle of rotation of the three-dimensional space around the fixed point is used.

(5) The center of rotation of the three-dimensional space is the center of gravity of the three-dimensional space which is finite.

(6) In the step of projecting the three-dimensional space on the two-dimensional plane while changing the projection angle, the input device supplies parameters on which the projection angle is dependent in both the horizontal and vertical directions of the two-dimensional projection plane displayed on the display.

(7) In the step of supplying the parameters, a pattern having a cross depicted in a rectangular area is displayed on the display, and, regarding the pattern as a two-dimensional coordinate system having its origin at the cross point of the cross and using the horizontal and vertical directions of the two-dimensional coordinate system as the parameters of the projection angle in the horizontal and vertical directions respectively, a point is specified in the displayed pattern.

(8) In the step of changing the projection angle, a parameter $\beta$, on which the projection angle is dependent, is specified by the input device so that, when the value of the projection angle is $\alpha$ at a given time, the value of the projection angle is changed next to $\alpha'$ given by $\alpha'=\alpha+f(\beta)$.

(9) In the step of seeking the vector, a rotation matrix of the rotation is used.

Also, for the purpose of attaining the second object described above, the extracted vector or straight line is projected and displayed on the two-dimensional plane.

DESCRIPTION OF THE PREFERRED EMBODIMENTS

For a better understanding of the present invention, its basic principle will be first described by reference to FIGS. 5A, 5B and 5C.

A straight line in a three-dimensional space can be given by a line of intersection between two planes. Also, when a three-dimensional space is projected on a projection plane perpendicular with respect to a plane in the three-dimensional space, that plane is given by a straight line on the projection plane. Further, when the three-dimensional space is projected on the projection plane, a straight line perpendicular with respect to this projection plane is given by a point on the projection plane.

Therefore, in a three-dimensional space in which distributed features are correlated, a three-dimensional vector indicating the correlation of the distributed features can be sought by the steps of processing described by reference to FIGS. 5A to 5C.

Figure 5A:
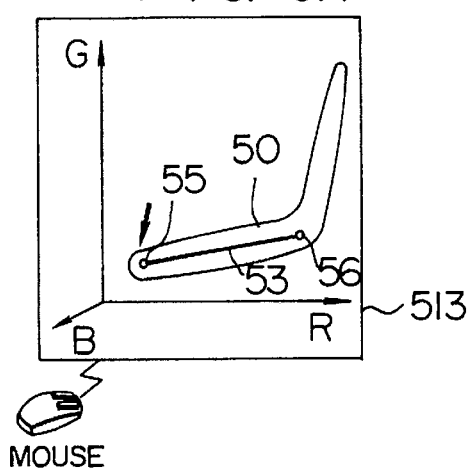
FIGS. 5a, 5B and 5C illustrate the principle of a method of the present invention.
Figure 5B:
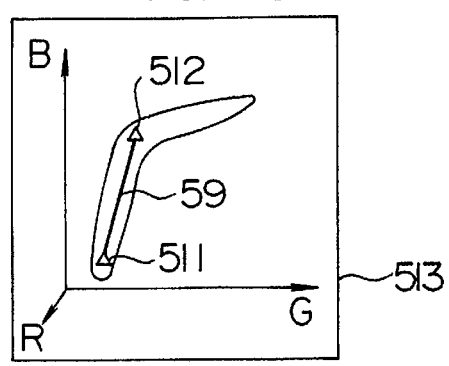
Figure 5C:
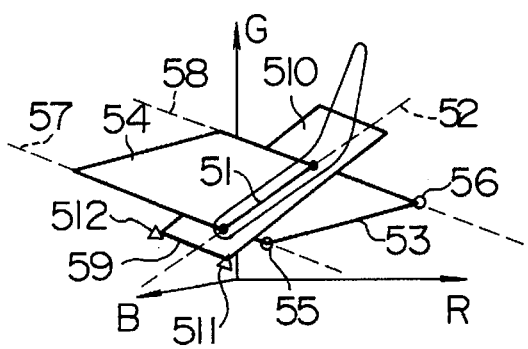
Figure 6:
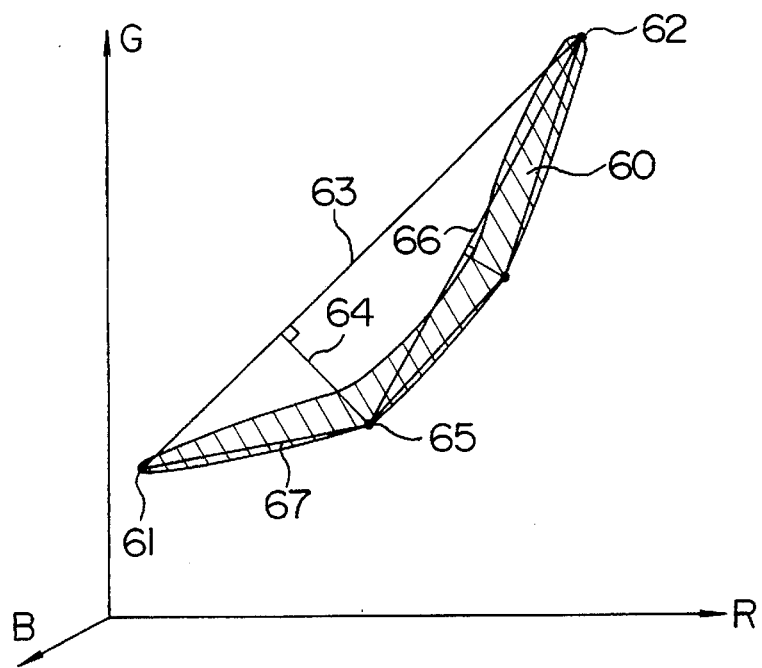
FIG. 6 illustrates the principle of a prior art method.

As shown in FIG. 5A, a three-dimensional feature distribution space projected on a projection plane is first displayed on a display 513, and, on the displayed projections plane, a line segment 53 is specified on an area 50 where feature plotted points cluster linearly. When the segment 53 is specified as shown in FIG. 5A, a plane 54 including a three-dimensional vector 51 to be extracted from the three-dimensional feature space is determined as shown in FIG. 5C. Then, as shown in FIG. 5B, the three-dimensional feature space is projected again while changing the projection angle, and a line segment 59 is similarly specified on an area on the projection plane where the plotted points linearly cluster. When the segment 59 is so specified, another plane 510 is determined as shown in FIG. 5C. Then, when a line of intersection 52 between these two planes 54 and 510 in the three-dimensional feature space is sought, this intersection line 52 is a straight line indicating the correlation of the RGB components. Also, this intersection line 52 includes the three-dimensional vector to be extracted. The terminal points 55 and 56 of the segment 53 specified on the projection plane are located on respective straight lines 57 and 58 on the plane 54 in the three-dimensional feature space, and the intersections between these straight lines 57, 58 and the intersection line 52 in the three-dimensional feature space provide the start and end points respectively of the three-dimensional vector 51.

It is arranged so that the projection angle can be freely changed. After the determination of the vector 51 and the straight line 52 in the three-dimensional feature space or after the determination of the segments 53 and 59 on the two-dimensional projection plane, they are immediately displayed on the display screen of the display 513, so that the suitability or validity of the vector 51, the straight line 52 and the segments 53, 59 thus determined can be confirmed in real time.

Unlike the prior art method for vector extraction by means of numerical processing, the present invention carries out the vector extraction by means of interactive processing. Thus, according to the present invention, the suitability or validity of an extracted three-dimensional vector or an extracted straight line can be easily visually verified in real time in the course of the extraction of the vector or the straight line. Therefore, the vector or the straight line can be extracted with high reliability.

Further, simultaneously with the extraction of the three-dimensional vector or the straight line, the feature plotted points are naturally, visually classified. Therefore, even when there are a plurality of correlated feature groups, the pre-processing for the purpose of plotted point classification is unnecessary.

Also, the present invention can be applied to the pre-processing carried out prior to the principal component analysis so as to generally simplify the classification of the feature plotted points. In such a case, after the extraction of vectors, the individual feature plotted points are classified so that each of them belongs to a vector nearest thereto.

An embodiment of the method according to the present invention will now be described in detail by reference to FIGS. 1 to 4. In this embodiment, a vector Vd of a diffuse reflection, a vector Vs of a specular reflection and a vector Va of an ambient shown in FIG. 2 are extracted from a RGB (three primary colors) feature space where pixel values C (R, G, B) ($0 \leq R, G, B \leq 255$; R, G, B eintegers) of an object region in a color image are plotted.

Figure 1:
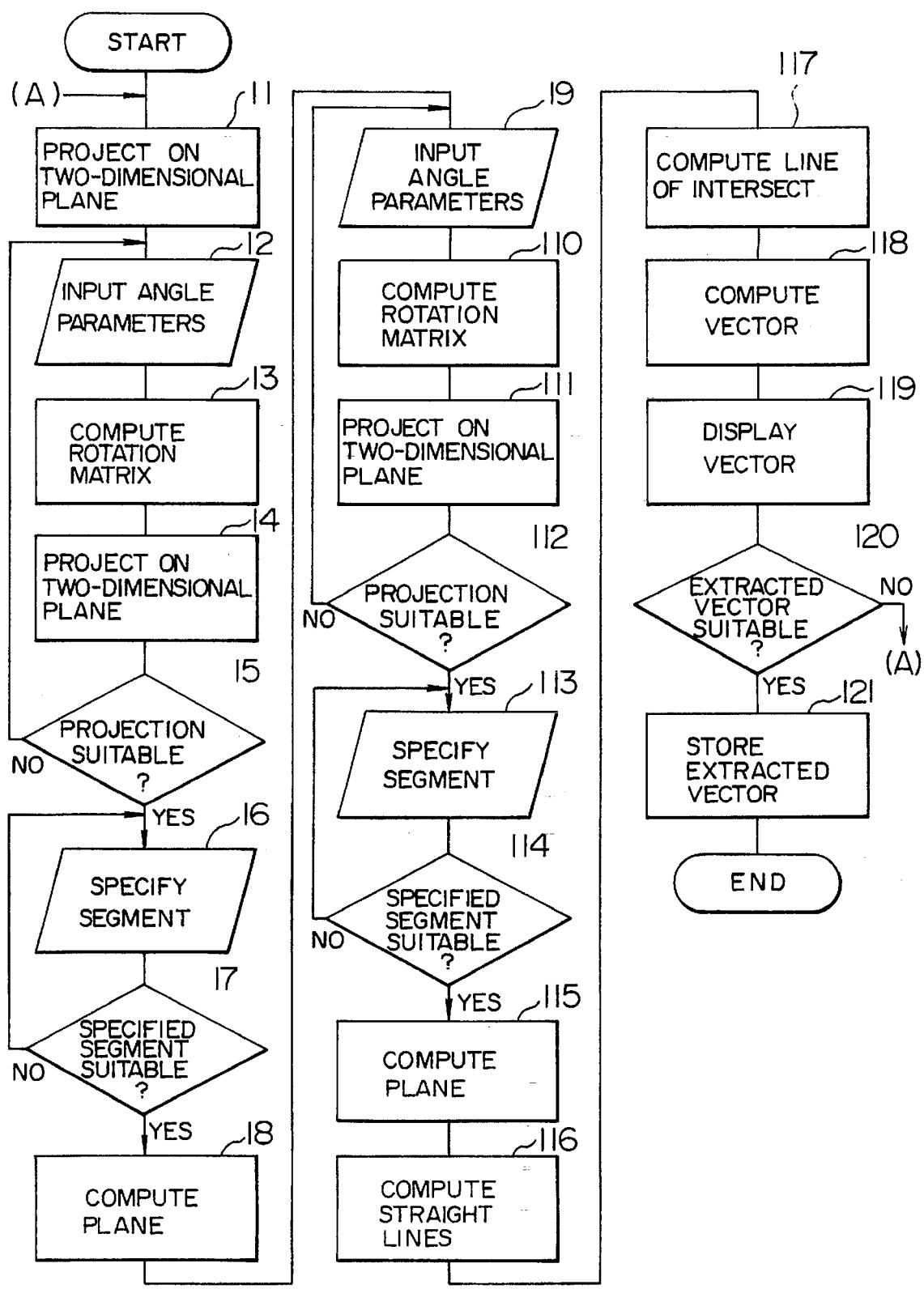
FIG. 1 is a flow chart showing the sequence of processing in an embodiment of the method according to the present invention.
Figure 2:
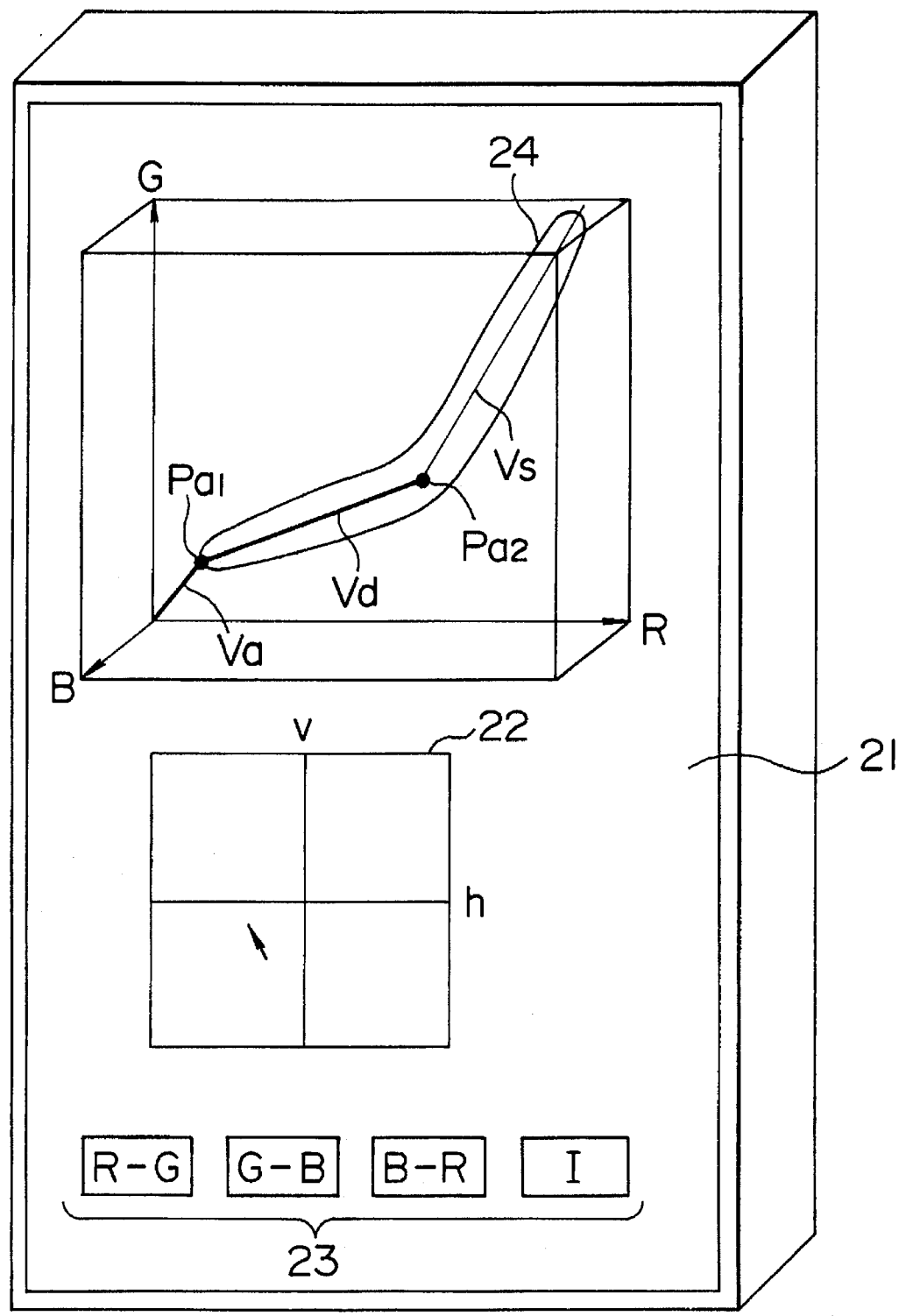
FIG. 2 illustrates a three-dimensional vector displayed on a CRT used for the practice of the embodiment of the method shown in FIG. 1.
Figure 3A:
FIGS. 3A, 3B, 3C and 3D illustrate rotation of a three-dimensional space.
Figure 3B:
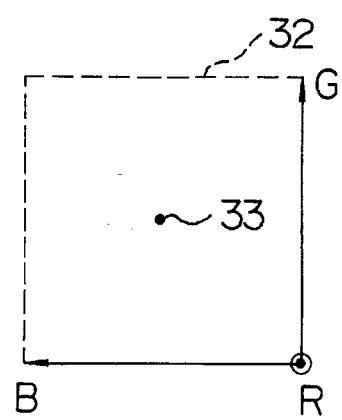
Figure 3C:
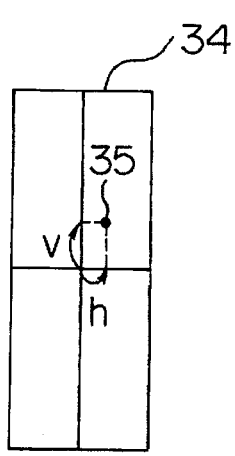
Figure 3D:
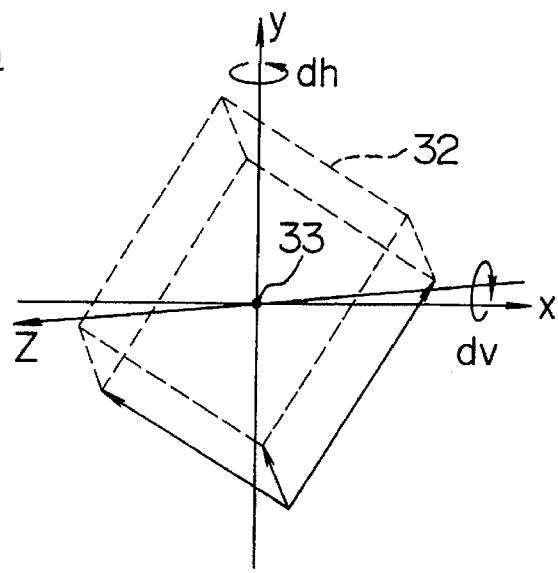
Figure 4:
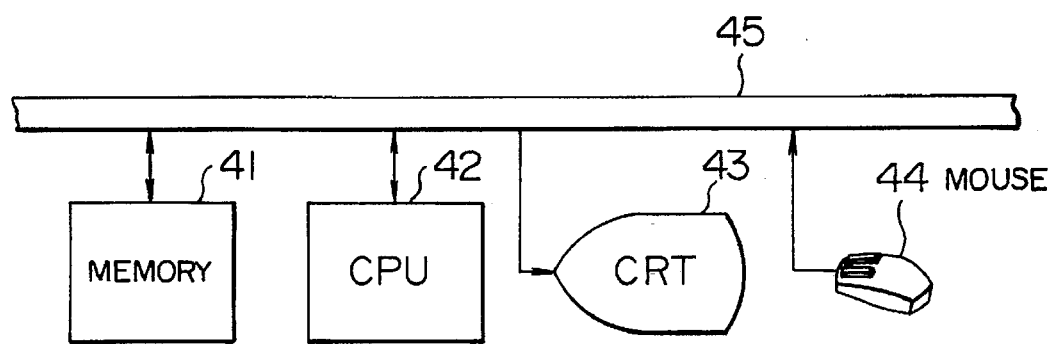
FIG. 4 is a block diagram of a computer system used for the practice of the embodiment of the method shown in FIG. 1.

FIG. 1 is a flow chart showing the sequence of processing executed in the embodiment of the present invention, FIG. 2 illustrates the vectors displayed on a CRT used for the practice of the embodiment shown in FIG. 1, FIGS. 3A to 3D illustrate rotation of the three-dimensional space, and FIG. 4 is a block diagram of a computer system used for the practice of the embodiment shown in FIG. 1. It is to be noted that the flow chart shown in FIG. 1 represents the sequence of processing executed until one of the vectors is extracted. Thus, it is apparent that the processing sequence shown in FIG. 1 is repeated until all of the plural vectors are extracted.

First, the vector Vd shown in FIG. 2 is extracted according to the flow chart shown in FIG. 1. Subsequently, the vectors Vs and Va are entirely similarly extracted. Therefore, extraction of the vector Vd will only be described in detail herein by way of example.

The individual steps shown in the flow chart of FIG. 1 will now be described by reference to FIGS. 3A to 3D and 4.

(1) Step 11

A three-dimensional feature, that is, three-primary color pixel values stored in a memory 41 shown in FIG. 4 are projected on a CRT 43 shown in FIG. 4 to be displayed on the display screen 21 of the CRT 43, as shown in FIG. 2. In an initial stage of projection, a two-dimensional projection plane 31 is such that it is parallel to the R-G plane of a cube 32 in the form of the three-dimensional three-primary color space and perpendicular to the B-axis of the cube 32, as shown in FIGS. 3A and 3B.

Consider now the rotation of the cube 32 around its center of gravity 33 and a rotation matrix M when the positional relation between the two-dimensional projection plane 31 and the center of gravity 33 of the cube 32 in the form of the three-primary color space is fixed. A three-dimensional xyz coordinate system ($-122.5 \leq x, y, z \leq 122.5$; x, y, z $\in$ real numbers), in which the origin is the center of gravity 33 of the cube 32 in the form of the three-dimensional three-primary color space, and the directions of the x-axis, y-axis and z-axis are the same as the directions of the R-axis, G-axis and B-axis respectively of the cube 32 in the initial stage of projection, is shown in FIG. 3D. Thus, the rotation of the cube 32 relative to this xyz coordinate system may be considered. It is supposed that the values of $x_0$, $Y_0$ and $z_0$ relative to the values of $R_0$, $G_0$ and $B_0$ in the initial stage of projection are given by the following equation:

$$\left. \begin{array}{l} x_0 = R_0 + k \\ y_0 = G_0 + k \\ z_0 = B_0 + k \end{array} \right\} \quad (1)$$

where $x_0$, $Y_0$, $z_0$; and $R_0$, $G_0$, $B_0$ are coordinate values of the origins of the xyz three-dimensional coordinate system and the RGB three-dimensional three-primary color coordinate system respectively, and the value of k is k=122.5.

On the two-dimensional projection plane, an xy two-dimensional coordinate system is considered which is equivalent to the result of projection of the xyz three-dimensional coordinate system on the projection plane.

The rotation matrix M is stored in the memory 41 shown in FIG. 4. The initial value of this rotation matrix M is that of a unit matrix I.

(2) Step 12

A mouse 44 shown in FIG. 4 is used to input parameters which determine the angle of rotation of the three-dimensional space around the center of gravity 33 shown in FIG. 3B. As shown in FIG. 2, a two-dimensional rectangular area 22 is displayed on the display screen 21 of the CRT 43. This rectangular area 21 has its center located at the origin of the two-dimensional coordinate system displayed on the CRT display screen and is called hereinafter a rotation indicator 34 in FIG. 3C. The horizontal axis (h-axis) component and, the vertical axis (v-axis) component of the rotation indicator 34 shown in FIG. 3C are used as parameters h and v corresponding to increments hd and vd of the angle of rotation of the cube 32 relative to the y-axis and the angle of rotation of the cube 32 relative to the x-axis, respectively, in FIG. 3D. The mouse 44 connected to a bus line 45 shown in FIG. 4 is used to indicate a point (h, v) in the rotation indicator 34 shown in FIG. 3C.

(3) Step 13

The parameters h and v are used in a monotonically increasing function f so as to compute the rotation angle increments hd and vd by a CPU 42 shown in FIG. 4, as follows:

$$\left. \begin{array}{l} hd = f(h), df(h)/dh > 0, \\ vd = f(h), df(h)/dv > 0 \end{array} \right\} \quad (2)$$

$$f(0) = 0°,$$

$$f(h_{max} = v_{max}) = 90°, f(h_{min} = v_{min}) = -90°$$

Using the rotation angle increments hd and vd thus computed rotation increment angle matrices $D_h$ and $D_v$ are obtained as follows:

$$D_h = \begin{bmatrix} \cos hd & 0 & -\sin hd \\ 0 & 1 & 0 \\ \sin hd & 0 & \cos hd \end{bmatrix} T \quad (3)$$

$$D_v = \begin{bmatrix} 1 & 0 & 0 \\ 0 & \cos vd & \sin vd \\ 0 & -\sin vd & \cos vd \end{bmatrix} T \quad (4)$$

When the rotation angle increment matrix $D_h$ relative to the y-axis is first considered, the composite rotation angle increment matrix D is given by $$D = D_v D_h \tag{5}$$

On the basis of this rotation angle increment matrix D and the rotation matrix M stored already in the memory 41 shown in FIG. 4, a new rotation matrix M' indicating the rotation from the initial stage is computed by the CPU 42 shown in FIG. 4, as follows:

$$M' = D \cdot M \tag{6}$$

Since M=I as described already, the rotation matrix M' is expressed as M'=D. The matrix M' is substituted for M. M is stored again in the memory 41 shown in FIG. 4.

Not only the rotation angle increments from the present rotation angle can be specified, but also the angle of rotation from the initial stage of projection can be primarily specified by an array of buttons 23 on the CRT display screen 21 shown in FIG. 2. The buttons 23 designated "R-G", "G-B", "B-R" and "T" in FIG. 2 correspond respectively to the cases where "the R-G plane is parallel to the projection plane", "the G-B plane is parallel to the projection plane", "the B-R plane is parallel to the projection plane", and "the straight line R=G=B is perpendicular with respect to the projection plane." The rotation is specified by selecting the button area 23 by the mouse 44 shown in FIG. 4.

(4) Step 14

The rotation matrix M stored in the memory 41 shown in FIG. 4 is read out to two-dimensionally project and display the three-dimensional three-primary color (RGB) space on the display screen 21 of the CRT 43 as shown in FIG. 2.

(5) Step 15

When the operator viewing the distribution on the projection screen decides that the three-primary color space is sufficiently linearly distributed on the projection plane, the steps starting from "(6) Step 16" are executed. Otherwise, the steps ranging from "(2) Step 12" to "(5) Step 15" are executed again.

(6) Step 16

On an area 24 where the distribution clusters on the CRT display screen 21 as shown in FIG. 2, the mouse 44 is used to specify a line segment $P_{a1} P_{a2}$ on the CRT 43 shown in FIG. 4. The specified segment $P_{a1} P_{a2}$ is displayed on the CRT display screen 21

(7) Step 17

When the operator decides that the segment $P_{a1} P_{a2}$ suitably expresses the feature of the distribution, the steps starting from "(8) Step 18" are executed. Otherwise, "(6) Step 16" is repeated.

(8) Step 18

On the basis of the segment $P_{a1} P_{a2}$ displayed on the xy two-dimensional projection plane, the plane in the xyz three-dimensional space is computed by the CPU 42 shown in FIG. 4. Also, on the basis of the rotation matrix M stored in the memory 41 shown in FIG. 4, the CPU 42 shown in FIG. 4 computes the equation of the plane in the RGB three-dimensional coordinate system. The equation of the plane thus computed is stored in the memory 41.

The plane in the xyz three-dimensional space is first computed by the CPU 42 shown in FIG. 4. Suppose that the points $P_{a1}$ and $P_{a2}$ on the xy two-dimensional projection plane are given by $$P_{a1} = (h1, v1) \tag{7}$$

$$P_{a2} = (h2, v2) \tag{8}$$

$(-122.5 \leq h1, h2, v1, v2 \leq 122.5)$

When a line u normal to the plane is expressed as u=(a, b, c), the equation of the plane is given by $$ax + by + cz + d = 0 \tag{9}$$

where $$\left. \begin{array}{l} a = v1 - v2 \\ b = h2 - h1 \\ c = 0 \\ d = h1v1 - h2v1 \end{array} \right\} \tag{10}$$

Then, the computed plane is transformed into the RGB coordinate system. The RGB three-dimensional space has been rotated from the initial stage by rotation matrix M. Therefore, the plane given by the equations (9) and (10) is transformed by an inverse matrix $M_{-1}$ of the rotation matrix M so as to rotate the RGB space in the inverse direction.

First, the vector of the normal u is transformed as follows:

$$u^0 = M^{-1} = (a^0, b^0, c^0) \tag{11}$$

Similarly, the coordinate values of the point P(h1, v1, 0) on the plane are also transformed as follows:

$$P' = M^{\beta 1 \, 1} P = (x', y', z') \tag{12}$$

Therefore, from the equation (1), the point P'(x',y', z') is turned into a point $p^0$ ($r^0$, $g^0$, $b^0$) having the following coordinate values in the RGB coordinate system:

$$r^0 = x' + k, \quad g^0 = y' + k, \quad b^0 = z' + k \tag{13}$$

Thus, the plane given by the equations (9) and (10) is now given in the RGB coordinate system by $$a^0 R + b^0 G + c^0 B - a^0 r^0 - b^0 g^0 - c^0 b^0 = 0 \tag{14}$$

(9) After the plane described above is determined, another plane in the RGB coordinate system is similarly determined in the steps 19 to 115 by changing the angle of rotation and by specifying another line segment on the xy two-dimensional projection plane.

(10) Step 116

For the start and end points of one of the segments specified on the xy two-dimensional projection plane, equations of two straight lines passing these points respectively in the three-dimensional three-primary color space are to be sought. From the equations (7) and (8), two suitable points on each of two straight lines corresponding to the straight lines to be sought in the xyz three-dimensional coordinate system can be determined. For the start point $P_{a1}$ of the segment $P_{a1} P_{a2}$, these two points are determined as follow.

$$\left. \begin{array}{l} P_{a11} = (h1, v1, 0) \\ P_{a12} = (h1, v1, c) \end{array} \right\} \tag{15}$$

where $-122.5 \leq c \leq 122.5$)

Then, as in the case of the previous manner of computation of the plane, an inverse matrix $M^{-1}$ of the rotation matrix M is used to turn the equation (15) into the following equation (16) by inverse rotation:

$$\left. \begin{array}{l} P_{a11}' = M^{-1} P_{a11} \\ P_{a12}' = M^{-1} P_{a12} \end{array} \right\} \tag{16}$$

Thus, from the equation (1), the points $P_{a11}$ and $P_{a12}$ in the RGB coordinate system are now expressed as follows:

$$P_{a11}0 = P_{a11}' + k \choose P_{a12}0 = P_{a12}' + k \quad (17)$$

Therefore, in the RGB coordinate system of the three-dimensional three-primary color space, the straight line passing the two points shown in the equation (17) corresponds to the straight line passing the terminal point $P_{a11}$ of the segment specified on the two-dimensional projection plane.

Similarly, in the case of the end point $P_{a2}$ of the segment, the line passing this point in the RGB coordinate system of the three-dimensional three-primary color space is sought.

(11) Step 117

The line of intersection between the two planes given by the equation (14) is sought.

(12) Step 118

The points of intersection between the line of intersection described above and the two straight lines passing the respective terminal points $P_{a1}$ and $P_{a2}$ are sought. These points of intersection provide the start point and the end point of the vector. Because the points of intersection are not necessarily accurately detected due to a computation error, the nearest points on an intersection line between planes to the straight lines are selected. This step is unnecessary when the computation of the line of intersection including the vector Vd is required, but the vector Vd itself need not be computed.

(13) Step 119

The vector or the straight line is projected and displayed on the CRT 43 shown in FIG. 4 so as to confirm the result of extraction. (In the case of the projection of the straight line, the line is suitably clipped so that it-is to be contained in the three-dimensional three-primary color space.) After the transformation of the vector from the RGB coordinate system to the xyz coordinate system, the vector is rotated by the rotation matrix M stored in the memory 41 shown in FIG. 4 before being projected.

(14) Step 120

When the operator decides that the extracted vector displayed on the CRT 43 suitably represents the distribution, the vector extraction is ended, and the step 120 is followed by "(15) Step 121". Otherwise, the step 120 is followed by "(1) Step 11", and the vector Vd is extracted again.

(15) Step 121

The extracted vector Vd is stored in the memory 41 shown in FIG. 4.

By the above steps, the vector Vd or the line including the vector Vd is sought. Thereafter, as in the case of the extraction of the vector Vd, the other vectors Vs and Va shown in FIG. 2 are similarly extracted by the sequence of processing from "(1) Step 11" to "(15) Step 121" shown in FIG. 1.

Thus, even when a plurality of three-dimensional features are correlated with one another, the vectors can be extracted by repeatedly executing the sequence of processing described above.

It will be understood from the foregoing detailed description of the method and apparatus of the present invention that a three-dimensional vector and a straight line can be highly reliably, simply and accurately extracted within a short time from a space of correlated three-dimensional features without the necessity for selecting a specific processing sequence depending on the object.

We claim:

1. A method for extracting a three-dimensional color vector approximately representing a cluster of plotted points in a three-dimensional RGB primary color space, said plotted points indicating the distribution of the R, G, B components of color pixels of a specific object in a color image, the method comprising the steps of:

designating a direction of a first projection plane;

in response to said step of designating the direction of said first projection plane, projecting said plotted points in said three-dimensional RGB color space on said first projection plane;

displaying a first projection image of said first projection plane on a display;

designating a first line segment on said display, said first line segment expressing the feature of a distribution of said plotted points projected on said first projection image;

in response to said step of designating a first line segment on said display, determining a first equation expressing a first designated plane in said three-dimensional RGB primary color space, said first designated plane being perpendicular to said first projection plane, wherein the projection of said first designated plane on said first projection plane is said first line segment;

designating the direction of a second projection plane;

in response to said step of designating the direction of a second projection plane, projecting said plotted points in said three-dimensional RGB primary color space onto said second projection plane;

displaying a second projection image of said second projection plane on said display;

designating a second line segment on said display, said second line segment expressing the feature of the distribution of said plotted points projected on said second projection image;

in response to said step of designating a second line segment on said display, calculating a second equation expressing a second designated plane in said three-dimensional RGB primary color space, said second designated plane being perpendicular to said second projection plane, wherein the projection of said second designated plane on said second projection plane is said second line segment; and extracting said three-dimensional color vector by extracting a line of intersection of said first designated plane and said second designated plane from said first equation and said second equation, wherein said line of intersection includes said three-dimensional color vector.

2. A method for extracting a three-dimensional color vector according to claim 1, wherein said step of designating a first line segment includes the step of denoting, on said first projection plane, an area where the plotted points cluster, by indicating on the display a start point and an end point of said first line segment to express said area.

3. A method for extracting a three-dimensional color vector according to claim 1, wherein said color vector is defined by the steps of determining, as a start point of said color vector, a point of intersection between a straight line passing a start point of one of said line segments designated on said display and perpendicularly intersecting said first projection plane in said three-dimensional RGB color space, and the line of intersection between said first and second designated planes in said three-dimensional RGB color space; and determining, as an end point of said color vector, a point of intersection between a straight line passing an end point of one of said line segments designated on said display and perpendicularly intersecting said first projection plane in said three-dimensional RGB color space, and the line of mutual intersection of said first and second designated planes in said three-dimensional RGB color space.

4. A method for extracting a three-dimensional color vector according to claim 1, wherein said step of projecting said plotted points on said first projection plane includes the step of fixing a positional relation between a fixed point in said three-dimensional RGB color space and said first projection plane and using, as the projection angle of said step of projecting said plotted points on said first projection plane, an angle of rotation of said three-dimensional RGB color space around said fixed point.

5. A method for extracting a three-dimensional color vector according to claim 5, wherein said three dimensional RGB color space is finite, and wherein said fixed point of said three-dimensional RGB color space in said projecting step is a center of gravity of said three-dimensional RGB color space.

6. A method for extracting a three-dimensional color vector according to claims 4, wherein said step of projecting said plotted points on said second projection plane includes the step of supplying, from an input device, parameters on which two angles of said rotation of said three-dimensional RGB color space around a horizontal axis and a vertical axis of a three-dimensional coordinate system are dependent, and wherein the origin of said three-dimensional coordinate system is said fixed point.

7. A method for extracting a three-dimensional color vector according to claim 1, wherein the projection angle of said step of protecting said plotted points on said second projection plane is determined by specifying by an input device a parameter $\beta$ on which said projection angle is dependent, so that, when the value of a previous projection angle is $\alpha$ at a given time, the value of said projection angle of said step of projecting said plotted points on said second projection plane is $\alpha'=\alpha+f(\beta)$.

8. A method for extracting a three-dimensional vector according to claim 1, wherein said three-dimensional color vector extracted with said line of intersection is at least one of a specular reflection vector representing a specular reflection component of said object and a diffuse reflection vector representing a diffuse reflection component of the object.

9. A method for extracting a three-dimensional color vector of a three-dimensional RGB three-primary color space where the distribution of the R, G, B components of color pixels of a specific object in a color image is approximately linear, comprising the steps of:

projecting said three-dimensional color space onto a two-dimensional plane;

displaying said two-dimensional plane on a display; and designating a line segment on said display according to the approximately linear distribution;

wherein the projecting, displaying and designating steps are executed at least two times to extract the color vector by changing an angle of the projection, including the steps of computing planes respectively including one of the line segments designated on said display during said designating step, and determining a line of mutual intersection of the planes computed during said computing step, said line of mutual intersection including said three-dimensional color vector to be extracted;

wherein said step of projecting the three-dimensional space on the two-dimensional plane includes the step of fixing a positional relation between a fixed point in said three-dimensional space and said two-dimensional plane and using, as said projection angle, an angle of rotation of said three-dimensional space around said fixed point;

wherein said step of projecting the three-dimensional space onto the two-dimensional plane after changing the projection angle includes the step of supplying, from an input device, parameters on which two angles of said rotation of said three-dimensional space around a horizontal axis and a vertical axis of a three-dimensional coordinate system are dependent, the origin of said three-dimensional coordinate system being said fixed point; and wherein said step of supplying parameters includes the steps of displaying on said display a pattern having a cross depicted in a rectangular area, and specifying a point in said displayed pattern, while regarding said pattern as a two-dimensional coordinate system having its origin located at the cross point of said cross and using the horizontal and vertical directions of said three-dimensional coordinate system as the parameters of said angle of rotation around said horizontal and vertical axes, respectively.

* * * * *